United States Patent [19]

Komatsu et al.

[11] 4,368,493
[45] Jan. 11, 1983

[54] TAPE CASSETTE DEVICE

[75] Inventors: Takashi Komatsu, Yokohama; Tadao Seki, Iwatsuki; Yuichi Igarashi, Yokohama, all of Japan

[73] Assignee: Tokyo Shibaura Denki Kabushiki Kaisha, Kawasaki, Japan

[21] Appl. No.: 216,502

[22] Filed: Dec. 15, 1980

[30] Foreign Application Priority Data

Dec. 26, 1979 [JP] Japan .................. 54-169745

[51] Int. Cl.³ .................. G11B 15/00; G11B 15/70
[52] U.S. Cl. .................. 360/93; 242/55.19 A; 242/198; 360/90
[58] Field of Search .......... 360/93, 90, 132; 242/55.19 A, 97-98

[56] References Cited

U.S. PATENT DOCUMENTS

| | | | |
|---|---|---|---|
| 3,957,219 | 5/1976 | Tsukamoto et al. | 242/55.19 A |
| 4,293,882 | 10/1981 | Moris | 360/93 |
| 4,311,286 | 1/1982 | Akino et al. | 360/93 |

FOREIGN PATENT DOCUMENTS

55-67969  5/1980  Japan .................. 360/93

Primary Examiner—Alfred H. Eddleman
Attorney, Agent, or Firm—Oblon, Fisher, Spivak, McClelland & Maier

[57] ABSTRACT

A tape cassette device comprises a cassette case in which a stationary reel with a tape guide path is housed, and an endless tape wound on the outer circumference of said stationary reel, the innermost part drawn out along said guide path to the inside of said stationary reel to be wound on the outer circumference of said stationary reel. Said case has a bottom plate having a scanning head and a tape drive mechanism inserting opening located at the inside of said stationary reel. A pair of sliders are disposed inside said cassette case, which are displaceable between a lower position where it is located at the side of said bottom plate for closing said opening and an upper position where it is located away from said bottom plate for opening said opening.

10 Claims, 13 Drawing Figures

TAPE CASSETTE DEVICE

BACKGROUND OF THE INVENTION

The present invention relates to a tape cassette device in which is mounted an endless tape which magnetically records, for example, video signals and which is driven to travel at high speed.

For recording video signals on a magnetic recording tape and for reproducing them, the relative speed of the tape and the head mechanism must be high, for example, over 5 m/sec. Thus, for recording and reproducing video signals with a stationary head mechanism while driving the tape at a high speed, the tape must be made to travel at the above-mentioned high speed. This results in extremely increased consumption of the tape per unit time. In order to improve the efficiency of use of the tape, it is possible to arrange a number of tracks in the direction of the width of the tape. However, it is practically impossible to reverse the direction of tape travel at the end of the tape for sequential use of the tracks.

Thus, it has been proposed to arrange the tape so that it rotates in an endless manner and to set the direction of the tape travel in one particular direction while sequentially changing over the track after every full circle of the tape, so that the video signals may be recorded and reproduced over an extended period of time in a continuous manner.

A tape cassette device using an endless tape has been conventionally used for recording audio signals wherein a tape is wound on a reel for storage. The tape is drawn out from the inner periphery or the outer periphery of the wound portion for supplying it to the head mechanism of the recording and reproducing mechanism. In audio equipment, the tape is supplied to the outer periphery of the reel, and the recording and reproducing part and the tape drive mechanism are arranged at the end face of the cassette case enclosing the endless tape.

With such a construction, an opening may be formed at a position corresponding to one end face of the cassette, and the tape drawn out from the reel may be guided through this opening. Therefore, the cassette mechanism may be made simpler, and the structure of the head mechanism and the tape drive mechanism of the recording and reproducing mechanism of the cassette may be made simpler.

With this construction utilizing an endless tape, the device may be adopted for recording and reproducing audio signals at a tape speed of several centimeters per second. However, this construction is unsuitable for recording and reproducing video signals which require a tape speed of more than 5 meters per second, since this exerts too much load on the tape. Further, since the head mechanism and the drive mechanism for recording and reproduction are arranged outside the reel, the tape cassette is made larger in size so that the tape loading procedure becomes complex.

Considering this, it has been alternatively proposed to draw out the tape from the inner periphery of the reel and to arrange the head mechanism and the tape drive mechanism including the capstan and pinch roller inside the reel. According to this method, a ring-shaped reel is arranged in a fixed manner inside the cassette case, and part of the reel is notched away for forming a tape drawing window through which the tape at the inner periphery of the tape coil is drawn out. When the cassette is mounted on a recording and reproducing mechanism, the tape drive mechanism and the head mechanism at the cassette mounting surface of this mechanism are inserted through the cassette bottom plate into the stationary reel inside the cassette for driving the tape.

In an endless tape cassette of this type, a large opening is formed in the bottom plate at a position corresponding to the center of the stationary reel, and it is necessary to arrange roller holes at positions corresponding to the rollers in the recording and reproducing mechanism in a manner corresponding to the outer circumference of the reel and to support the tape mounted on the reel.

This means that the tape is encased and held inside a box body, while a large opening is formed in the bottom plate of the box body. Thus, in a tape cassette of this type, it is necessary to dispose a cover which effectively closes the opening formed in the bottom plate.

Moreover, the tape drawn to the center of the stationary reel is wound on the outer periphery of the reel. During this procedure, the tape may be loosened on the reel. When the tape is in this loosened condition on the reel, for mounting the cassette on the recording and reproducing mechanism, the tape may not be correctly loaded due to the relations among the space between the capstan and the pinch roller, the front surface of the head mechanism and the guide hole, resulting in complex handling of the tape cassette and irregular tape loading.

SUMMARY OF THE INVENTION

It is, therefore, the object of the present invention to provide a tape cassette device used especially in a high speed tape device wherein an opening formed in the cassette case is effectively closed when the cassette case is not mounted on the recording and reproducing mechanism and tape loading control may be effectively facilitated.

DESCRIPTION OF THE PREFERRED EMBODIMENT

Figure 1:
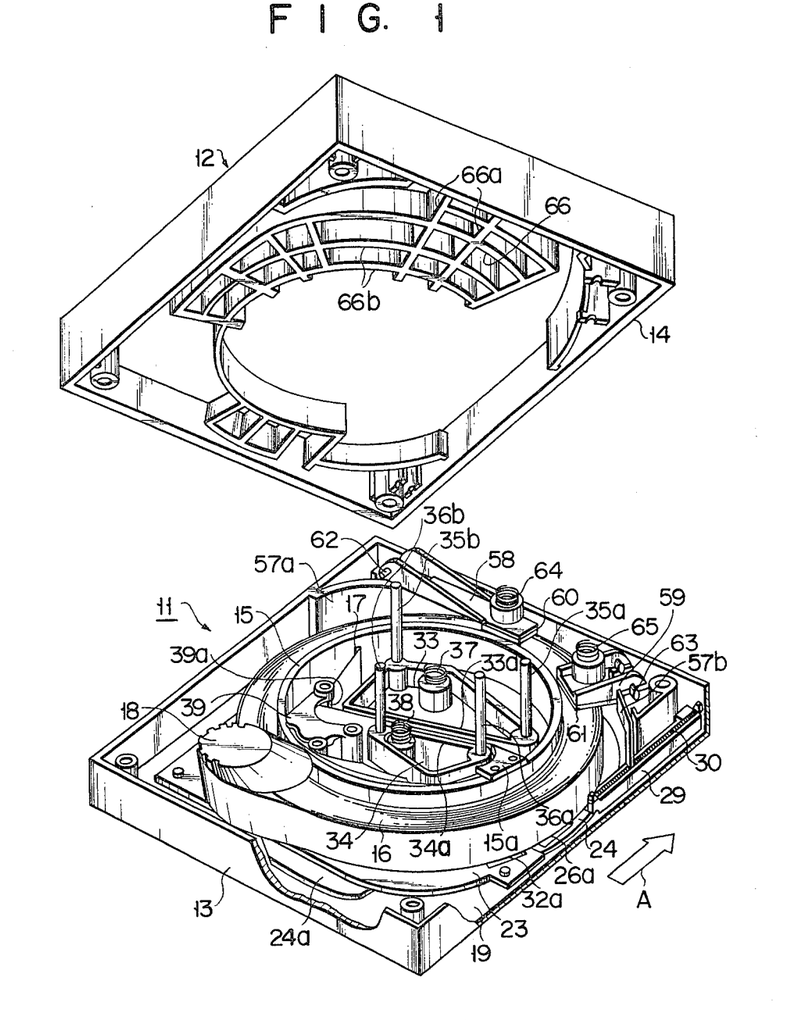
FIG. 1 is a partially cutaway exploded perspective view illustrating a cassette case device in accordance with an embodiment of the present invention.

An embodiment of the present invention will now be described with reference to the accompanying drawings. FIG. 1 is a partially cutaway exploded view of a cassette device with an endless tape mounted therein which comprises a main body 11 and a lid body 12, each having thin box-shaped cases 13, 14 with their opposing surfaces open. They are superposed on each other and connected by means of, for example, screws, thereby constituting a thin square box-shaped cassette casing. A ring-shaped stationary reel 15 is disposed inside the case 13 of the main body 11. Around the outer circumference of the stationary reel 15 is wound an endless magnetic recording tape 16 whose innermost loop is drawn toward the center of the reel 15 through a drawing window 17 formed in the stationary reel 15 and extending from the outer circumference to the inner circumference of the reel. The drawn-out tape is extended over the wound tape through a skipping guide 18 and is wound around the outer circumference of the tape 16. The mechanism for driving the tape 16, the head mechanism and so on are inserted inside the inner circumference of the stationary reel. The tape 16 is drawn out from the drawing window 17 by the tape drive mechanism to travel, contacting the head whose position is stationary. The tape 16 wound on the reel 15 slides between the coiled layers at the outer periphery of the reel 15 and rotates.

Figure 2:
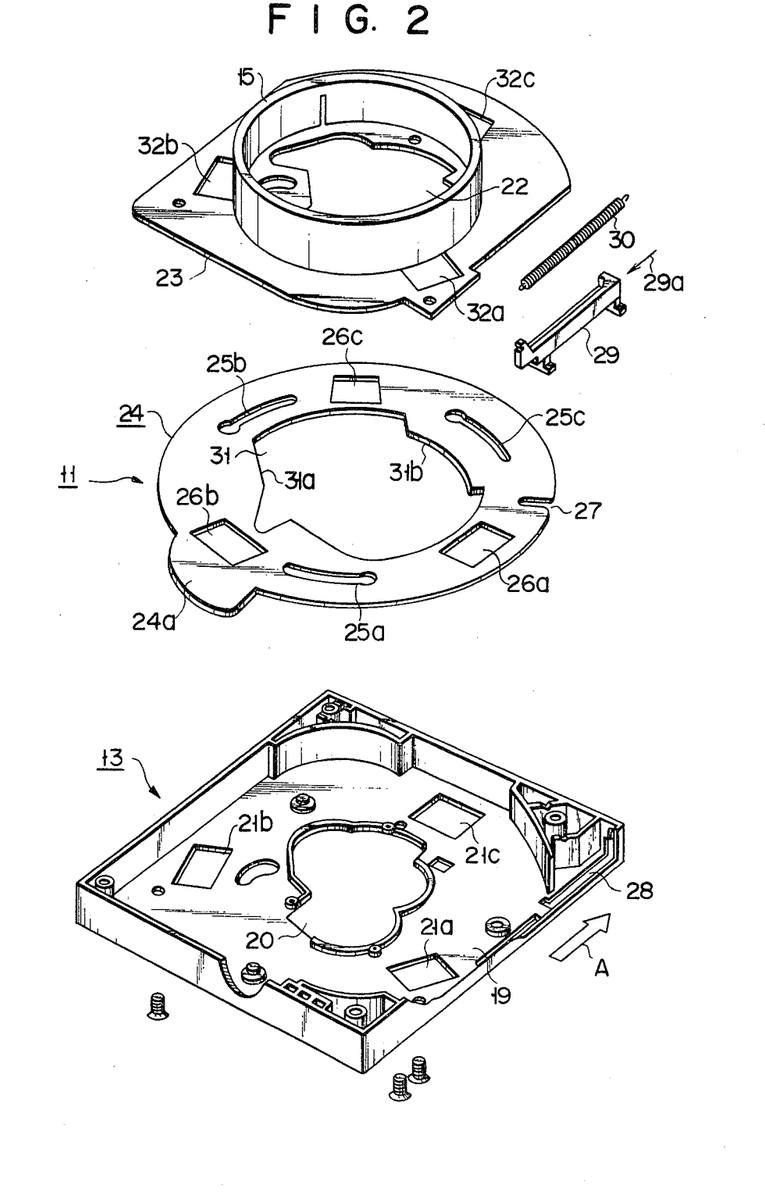
FIG. 2 is a partially cutaway exploded perspective view illustrating the main body of the cassette case device of FIG. 1.

FIG. 2 is an exploded view illustrating the case 13 of the main body 11 and its related parts. In a bottom plate 19 of the case 13, of a plastic material, for example, are formed a tape drive mechanism consisting of a capstan, a pinch roller, and so on formed on the cassette mounting surface of a recording and reproducing mechanism (not shown), and a central hole 20 corresponding to a head mechanism. These mechanisms are inserted through this hole into the case 13 when mounting the cassette. On the cassette mounting surface of the above-mentioned recording and reproducing mechanism are disposed, for example, three rubber rollers which support the tape 16 mounted on the stationary reel 15 and which help the rotation of the tape at the outer periphery of the reel 15. Roller holes 21a-12c through which these rollers protrude inside the case 13 are formed in the bottom plate 19 in an equidistantly spaced relationship around a circle.

A base plate 23 with a through hole 22 corresponding to the central hole 20 is mounted on the bottom plate 19 of the case 13. A disk-shaped blind 24 is interposed between the base plate 23 and the bottom plate 19. The blind 24 is rotatably mounted between the bottom plate 19 and the base plate 23 coaxially with the stationary reel 15 by the insertion of stepped pins protruding from the bottom plate 19 in arc-shaped guide holes 25a-25c formed along the same circle.

The blind 24 further has roller holes 26a-26c, and at its outer periphery a locking hole 27. The front end of a slide bar 29 mounted at a notched part 28 at one side edge of the case 13 is locked in the locking hole 27. Both ends of a tension spring 30 are locked with the slide bar 29 and the case 13, so that the blind 24 rotates when the slide bar 29 is driven as shown by the arrow 29a against the biasing force of the spring 30, and the roller holes 26a-26c become aligned with the roller holes 21a-21c of the case 13. The blind 24 is usually biased by the spring 30 so that the roller holes 21a-21c are not aligned with the roller holes 26a-26c, and the roller holes 21a-21c are closed by the blind 24.

For mounting this cassette device in a recording and reproducing mechanism, the cassette device is inserted in the cassette guide part of the mechanism in the direction shown by the arrow A. Then the slide bar 29 is driven against the biasing force of the spring 30 in the direction shown by the arrow 29a by a locking body suitably formed at the cassette guide part. Thus, the blind 24 is rotated so that the roller holes 26a-26c are aligned with the roller holes 21a-21c.

A through hole 31 corresponding to the central hole 20 is formed in the blind 24. This through hole 31 has locking edges 31a, 31b which will be use for a mechanism to be described hereinafter. Locking and releasing of the locking edges 31a, 31b are performed according to the rotation of the blind 24 in the mounting operation of the cassette device.

The stationary reel 15 is secured to the base plate 23, and roller holes 32a-32c are formed to align with the roller holes 21a-21c of the case 13 at positions corresponding to the wound tape coil at the outer periphery of the case 13. When the cassette device is mounted on the recording and reproducing mechanism, the rollers on the mechanism support the wound tape 16 from beneath at the outer periphery of the reel 15 through the roller holes 26a-26c of the blind 24 which rotates with the mounting operation, so that the rollers rotate at the outer periphery of the reel 15.

Figure 3:
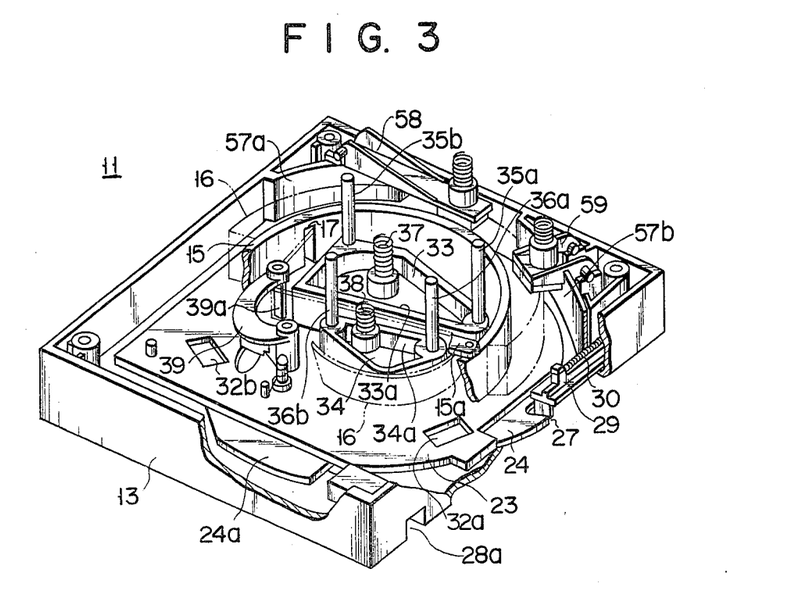
FIG. 3 is a partially cutaway perspective view illustrating the main body, after assembly, of the cassette case device of FIG. 2.
Figure 4:
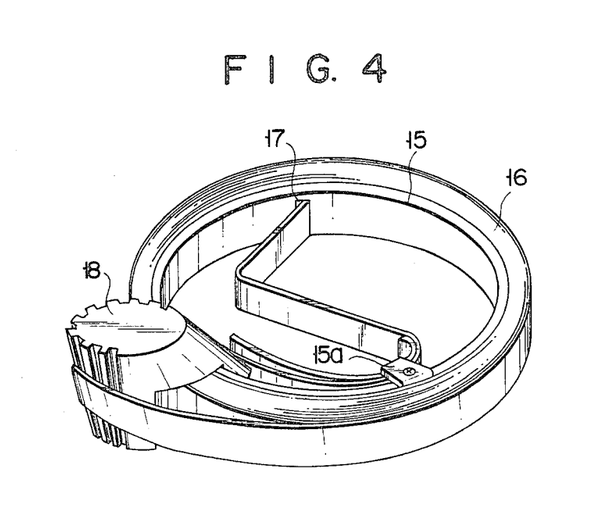
FIG. 4 is a perspective view illustrating the stationary reel of the main body of FIG. 3.

At the inner periphery of the stationary reel 15 are arranged first and second sliders 33, 34 as shown in FIG. 3. These sliders 33, 34 are constructed to be vertically movable along guide poles 35a, 35b and guide poles 36a, 36b, respectively, and are in contact with the inner surface of the lid body 12 through springs 37, 38, so that they are constantly pressed downward, that is, toward the bottom plate 19. These sliders 33, 34 have guide surfaces 33a, 33a facing each other which are of vertically extending wall shape and which define a space or a guide path between a loading pole 39a of a loading mechanism 39 and a stationary guide 15a of the reel 15. In this space is guided the tape 16 which has been drawn out through the drawing window 17 of the reel 15. Thus, the tape 16 on the stationary reel 15 is placed under the condition shown in FIG. 4, and the tape extending from the stationary guide 15a is directed by the skipping guide 18 to the outer periphery of the tape wound on the reel 15. The skipping guide 18 is of conical shape and straddles the reel 15 on which is mounted the tape. The skipping guide may be arbitrarily shaped for effectiveness when it is of a plastic molded material. By forming it with a plastic material, the formation of dew is effectively prevented and the sliding movement of the tape is facilitated. When waved parts extending in the direction of the width of the tape 16 are formed, the guide may be made more effective for smoother movement of the tape.

The first and second sliders 33, 34 also function as a closing body for closing the central hole 20 of the bottom plate 19 of the case 13 through the through hole 22 of the base plate 23, when in the pressed and descended condition. Thus, when the cassette device is not in use, the central hole 20 and the roller holes 21a-21c of the bottom plate 19 of the main body 11 are closed by the first and second sliders 33, 34 and the blind 24, so that the box body of the cassette device is closed.

Figure 5:
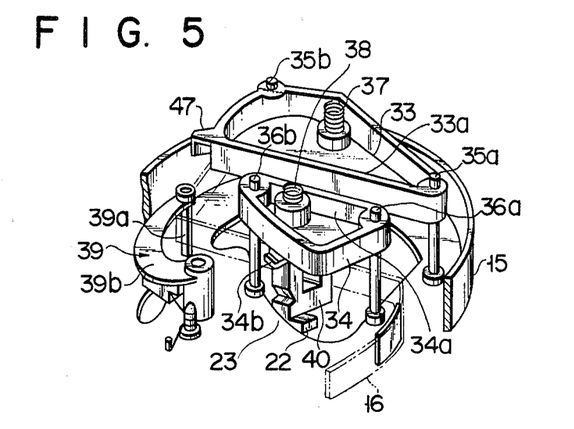
FIG. 5 is a perspective view illustrating the pair of sliders of the main body of FIG. 3.

The first and second sliders 33, 34 are pressed upward against the biasing force of the springs 37, 38 by a press-up body 40 protruding through the central hole 20 and the through hole 22 of the base plate 23, as shown in FIG. 5. The press-up body 40 is formed at the cassette mounting surface of the recording and reproducing mechanism and has a pair of legs which are positioned at both sides of the tape 16 interposed between the sliders 33, 34 and which contact the lower surfaces of the sliders 33, 34.

Figure 6:
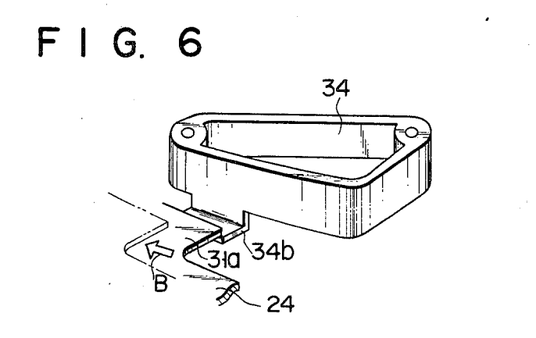
FIG. 6 is a perspective view illustrating the manner according to which one of the sliders engages with the locking edge of the blind.

A locking pawl 34b is formed on the slider 34, and the slider 33 has a similar locking pawl. The locking pawl 34b locks as shown in FIG. 6, with the locking edge 31a formed at the through hole 31 of the blind 24 when the sliders are pressed downward by the springs 37, 38, as shown in FIGS. 1 and 2. When the blind 24 is rotated in the direction shown by the arrow B in response to the mounting operation of the cassette device, the locking edge 31a is released from the locking pawl 34b, permitting the sliders 33, 34 to ascend, as shown in FIG. 5.

Although not shown in FIG. 5, at parts of the cassette mounting surface of the recording and reproducing mechanism corresponding to the first and second sliders 33, 34 are disposed a capstan and a pinch roller. They protrude through the through hole 22 under the condition shown in FIG. 5 and face both sides of the tape 16 interposed linearly between the loading pole 39a and the stationary guide 15a. When the pinch roller is pressed toward the capstan in the tape drive operation, the tape 16 is sandwiched between these parts and is made to travel according to the rotation of the capstan. The loading mechanism 39 is driven in response to the switching over the pinch roller toward the capstan, so that the tape 16 is guided by the pole 39a to the head mechanism located at the lower side of the first slider 33, for slidable contact therewith.

Figure 7A:
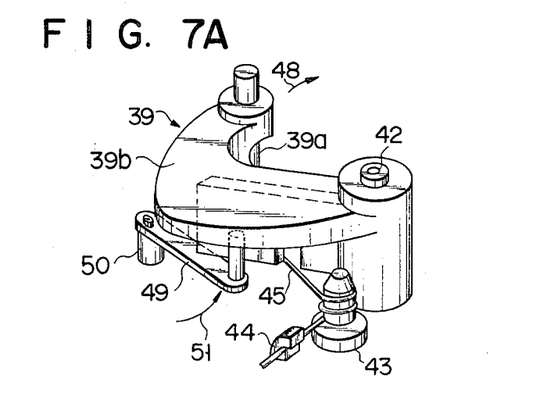
FIG. 7A is a perspective view illustrating the loading mechanism of the main body of FIG. 3.
Figure 7B:
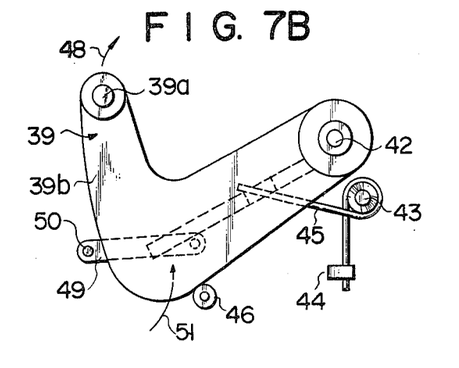
FIG. 7B is a plan view of the loading mechanism of FIG. 7A.

FIGS. 7A and 7B show the loading mechanism 39 apart from other components. A shaft 42 has an arm 39b which is pivotable and parallel with respect to the base plate 23 and which has at its front end the loading pole 39a depending from it. The loading arm 39b is biased in the counterclockwise direction of the figures by being locked at one end of a spring 45, the central portion of which is wound around a stationary shaft 43 and the other end of which is locked by a locking body 44. The normal position of the loading arm 39b is set by a stopper 46. At this normal position, the pole 39a is in alignment with the linear space or guide path defined by the guide surfaces 33a, 34a of the sliders 33, 34, and guides the tape 16 in the linear guide path in cooperation with the stationary guide 15a.

Figure 8A:
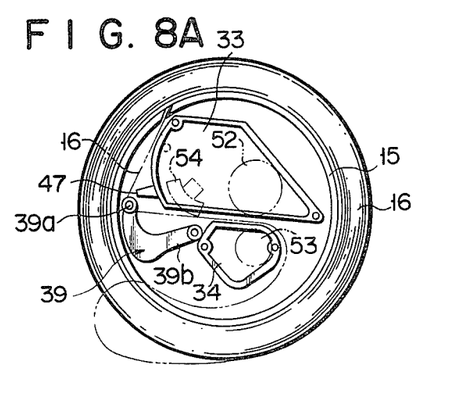
FIG. 8A is a plan view illustrating the pair of sliders and the loading mechanism.

A projection 47 is formed on the first slider 33 toward the pole 39a of the loading mechanism 39 at the normal position, as shown in FIG. 5, so as to prevent movement of the loading arm 39b by contacting it as shown in FIG. 8A when the tape is not loaded, that is, when the slider 33 is lower than the spring 37. As a result, under the non-loaded condition wherein the cassette device is not mounted on the recording and reproducing mechanism, the position of the tape 16 may be correctly maintained even when an external force is exerted for some reason on the loading arm 39b against the biasing force of the spring 45.

When the cassette device is mounted on the recording and reproducing device and the sliders 33, 34 are raised by the press-up body 40 as shown in FIG. 5, the loading arm 39b is pivotable in the direction shown by the arrow 48 of FIG. 7 against the biasing force of the spring 45.

When the cassette device is mounted on the recording and reproducing mechanism, a driving bar 49 of the recording and reproducing mechanism engages with the loading arm 39b, as shown in FIGS. 7A and 7B. The driving bar 49 is pivoted about a shaft 50 in cooperation with the pinch roller driving mechanism. The driving bar 49 is thus pivoted as shown by the arrow 51 in response to a tape drive instruction operation, pressing the pinch roller toward the capstan.

The driving bar 49 pivots the loading arm 39b in the direction shown by the arrow 48 against the biasing force of the spring 45 for guiding the tape loading pole 39a to the lower side of the first slider 33.

When the cassette device is mounted on the recording and reproducing mechanism and the sliders 33, 34 are raised against the biasing forces of the springs 37, 38, a capstan 52 and a pinch roller 53 with the tape 16 interposed therebetween are located at the lower side of the respective sliders 33, 34. A stationary head mechanism 54 is further located at the lower side of the slider 33.

Figure 8B:
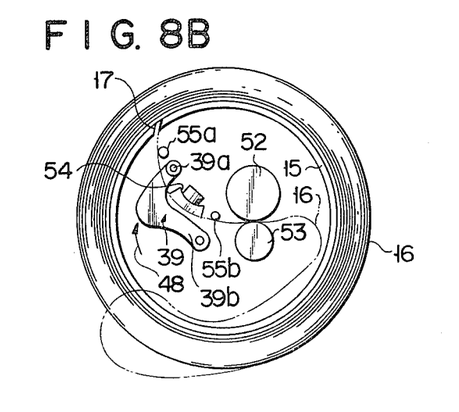
FIG. 8B is a plan view illustrating the condition of the loading mechanism of FIG. 8A when the pair of sliders is removed.

FIG. 8B shows the loaded condition where the sliders 33, 34 are removed. Guide poles 55a, 55b of the recording and reproducing mechanism are disposed respectively between the tape drawing window 17 of the stationary reel 15 and the head mechanism 54, and between the point of contact of the capstan 52 with the pinch roller 53 and the head mechanism 54. The loading pole 39a of the loading mechanism 39, pivoted in the direction of the arrow 48 as has been described, is arranged so as to be inserted between the head mechanism 54 and the guide pole 55a so that the tape 16 may be guided to the tape drive part by the guide pole 55a, the head mechanism 54, and the guide pole 55b.

Since the shaft 42 of the loading mechanism 39 is arranged opposite to the head mechanism 54 with the loaded and traveling tape 16 interposed therebetween, the shaft is not influenced by other components so that it may be assembled with other components at the side of the case 13 of the main body 11 constituting the cassette box body.

The tape 16 encased in the main body 11 is driven to travel for recording and reproducing video signals at the head mechanism 54 when the cassette device is mounted on the recording and reproducing mechanism.

The tape 16 wound on the stationary reel 15 may come apart due to movement of the cassette device, vibrations and so on. In order to prevent this, guide walls 57a, 57b having an arc shape corresponding to the outer shape of the wound tape 16 are formed at two inside corners of the case 13, and tape presses 58, 59 for pressing the tape from above are also formed, as shown in FIG. 1. The tape presses 58, 59 have respective pads 60, 61 at their fronts for pressing the top surface of the wound tape 16; the bases of the tape presses 58, 59 are received by bearing recesses formed in the case 13 by shafts 62, 63. Springs 64, 65 are arranged on top of the front ends of the tape presses 58, 59 above the positions of the pads 60, 61, so that when the lid body 12 is attached, they press the springs 64, 65 in a case 14 for pressing the pads 60, 61.

At the inner surface of the case 14 of the lid body 12 for attaching with the case 13 of the main body 11 is formed a rib member 66 corresponding to part of the tape 16 wound at the outer periphery of the stationary reel 15, for effectively preventing irregular movement of the tape 16 when the lid body 12 is attached to the main body 11. As is apparent from FIG. 1, the rib member 66 is formed in arc shape corresponding to the shape of the outer periphery of the stationary reel 15. This rib member is capable of effectively stabilizing the winding movement of the tape 16 by a rib portion 66a arranged radially with the tape 16. When the rib member 66 consists of the radial rib portion 66a with a tangential rib portion 66b arranged perpendicular thereto, the strength of the case 14 may be sufficiently improved while leaving it sufficiently light in weight, thereby providing tremendous advantages.

When the cassette device of the above-mentioned construction is not mounted on the recording and reproducing mechanism, the slide bar 29 is located at its normal position, i.e., at the notched part 28 formed in the case 13, by the action of the spring 30 during normal storage. In this case, the roller holes 26a-26c of the blind 24 are not aligned with the roller holes 21a-21c formed in the bottom plate 19 of the case 13, so that the blind 24 is placed at its rotating position for closing the latter holes. Simultaneously, since the force pressing up against the biasing force of the springs 37, 38 is not exerted on the first and the second sliders 33, 34, the sliders 33, 34 are pressed downward toward the bottom plate 19 of the case 13 by the springs 37, 38, and the locking pawl 34b is locked with the locking edges 31a, 31b of the slider 33, so that the sliders 33, 34 may be locked in the depressed conditions. Thus, the central hole 20 and the roller holes 21a-21c formed in the bottom plate of the case 13 are closed, so that the tape 16 and so on mounted inside may be safely protected.

The part of the tape 16 drawn from the inner periphery of the wound tape coil and guided toward its outer periphery is securely held between opposite linear edges 33a, 34a of the pair of sliders 33, 34 since the loading mechanism 39 is under the condition shown in FIG. 8A. Thus, the tape is well protected and is not wound irregularly, even when subjected to a great impact.

For mounting such a cassette device in the recording and reproducing mechanism, the cassette device is inserted in the cassette mounting part attached to the recording and reproducing mechanism as shown by the arrow A of FIG. 1. A locking body is formed in the cassette mounting part at a place corresponding to the notched part 28. Upon the insertion operation, the slide bar 29 slides against the biasing force of the spring 30 for rotating the blind 24. The roller holes 26a-26c, the roller holes 21a-21c and 32a-32b are thus aligned. Simultaneously, the locked condition of the first and second sliders 33, 34 effected by the locking edges 31a, 31b is released.

The cassette device is lowered to the surface of the tape drive mechanism of the recording and reproducing mechanism as it is encased inside the cassette mounting part. With this descent, the first and the second sliders 33, 34 whose locked conditions are released as shown in FIG. 5, are lifted by the press-up body 40 formed at the tape drive mechanism surface against the biasing force of the springs 37, 38 so that the capstan 52 and the pinch roller 53 are positioned at both sides of the tape 16 held taut between the loading pole 39a and the stationary guide 15a as shown in FIG. 8A. When a tape drive operation is performed under this condition, the tape 16 is sandwiched and held between the capstan 52 and the pinch roller 53, as shown in FIG. 8B. The driving bar 49 shown in FIG. 7 is pivoted as shown by the arrow 51 for pivoting the loading mechanism 39 in the direction shown by the arrow 48 against the biasing force of the spring 45. The loading pole 39a is inserted between the guide pole 55a and the head mechanism 54 as shown in FIG. 8B for loading the tape 16 so that it contacts the surface of the head mechanism 54. Thus, the capstan 52 is driven to rotate and the video signals are recorded or reproduced by the travel of the tape 16 at a predetermined speed.

In the head mechanism 54 described above, the recording and reproducing head is so constructed as to have a mechanism for changing over the position of the recording and reproducing head by moving the head a small distance in the direction of the width of the tape 16, for enabling the formation of a number of tracks on the endless magnetic recording tape 16. As a result, video signals may be recorded and reproduced continuously for an extended period of time.

In the embodiment described above, the direction for inserting the cassette device is specified as the direction shown by the arrow A of FIG. 1. However, a pawl 24a protruding to the outer periphery as shown in FIG. 2 may be formed on the blind 24, another slide mechanism 29a perpendicular to the slide bar 29 corresponding to the pawl 24a as shown in FIG. 3, and a notch 28a may be formed in the case 13. Then the cassette device may be inserted in the recording and reproducing mechanism in the direction perpendicular to the direction shown by the arrow A. The spring 30 may be used as a member for setting the normal position of the blind 24 in this case.

Figure 9:
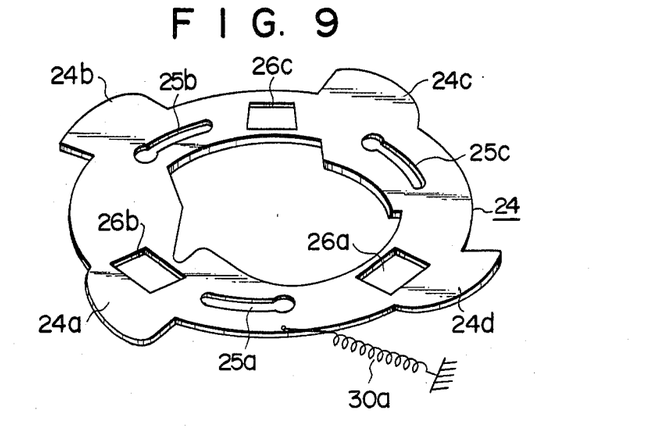
FIG. 9 is a perspective view illustrating a modification of the blind.

Alternatively, with a construction wherein pawls 24a-24c are formed at four sides of the blind 24 as shown in FIG. 9, it is possible to insert the cassette device from any of the four directions. This facilitates various designs of the recording and reproducing mechanism an interchangeability of the devices. In this case, a spring 30a for acting on the blind 24 may be suitably arranged between the stationary parts.

Figure 10:
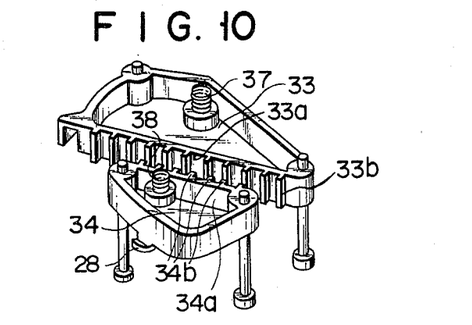
FIGS. 10 and 11 are a perspective view and a sectional view, respectively, of a modification of the slider.
Figure 11:
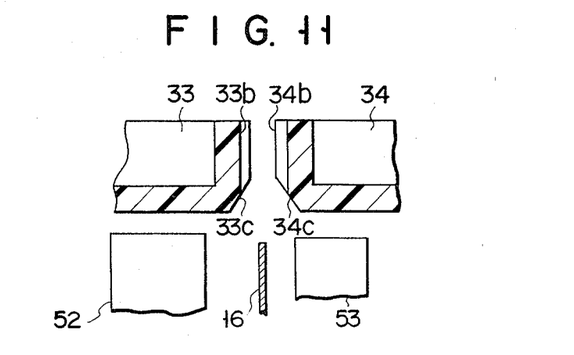

FIGS. 10 and 11 each show modifications of a displaceable closing means having the first and second sliders 33, 34. In these embodiment, the same parts are designated by the same numerals, and the description thereof is omitted.

The opposite guide surfaces 33a, 34a of the first and second sliders 33, 34 are spaced apart a predetermined distance in the transverse direction with respect to the direction of tape travel, and they have rectangular projections 33b, 34b each extending in the vertical direction, i.e., the direction of the width of the tape. Consequently, the portion of the tape defined by the guide surfaces 33a, 34a is in contact with the projections 33b, 34b of the guide surfaces 33a, 34a. Thus, by avoiding complete surface contact between the tape and the guide surfaces 33a, 34a, adhesion of the tape to the guide surfaces is prevented.

In the embodiment shown in FIG. 11, tapered surfaces 33c, 34c are formed at the lower ends of the guide surfaces 33a, 34a of the first and second sliders 33, 34. With this arrangement, the tape may be guided in the guide path by the tapered surfaces after the top end of the tape 16 contacts either of the tapered surfaces when the first and second sliders 33, 34 are lowered, even when the tape 16 and the guide path between the guide surfaces do not correspond correctly. Thus, the width of the guide path may be made smaller, and the sliders 33, 34 may be arranged so that the guide surfaces 33a, 34a are drawn nearer.

With the cassette device of the above construction, by the simple locking mechanism which follows the mounting operation of the cassette device in the cassette mounting portion of the recording and reproducing mechanism, the blind biased by the spring is driven to rotate. Thus, the tape wound on the stationary reel is supported and the roller holes corresponding to the rollers for facilitating the smooth winding of the tape are defined. These roller holes are automatically closed during the other operations so that the inside the cassette case is well protected. Since the rotation of the blind is well controlled, the above-mentioned control of the rotation against the biasing force of the spring may be effected even when a force is exerted on the square cassette case from any direction. Thus, the direction for mounting the cassette may be made free, facilitating the design of the recording and reproducing mechanism.

Further, since the blind is controlled to rotate between two positions it may be effectively used as a locking means for another locking mechanism. Thus, it is capable of effectively comprising the locking and closing mechanism of a closing body at another opening, such as the slider of the embodiment. The lock may be automatically released when the cassette is mounted.

What we claim is:

1. A tape cassette device comprising:
   a cassette case;
   a stationary reel which is disposed inside said cassette case and which has a tape guide path extending from the outer circumference to the inner circumference of said stationary reel;
   an endless tape which is wound on the outer circumference of said stationary reel and the innermost part of which is drawn out along said guide path to the inside of said stationary reel to be wound on the outer circumference of said stationary reel;
   said case having a bottom plate having a scanning head and tape drive mechanism inserting opening located at the inside of said stationary reel; and
   closing means disposed inside said cassette case and displaceable along the axis of said stationary reel between a first position where it is located at the side of said bottom plate for closing said opening and a second position where it is located away from said bottom plate for opening said opening, wherein said closing means includes at least one slider and means for displaceably guiding said sliders along the axis of said stationary reel between the first and second positions.

2. A tape cassette device as recited in claim 1 wherein said sliders have flat guide surfaces which face each other and are spaced apart by a predetermined distance for guiding the tape therebetween when said sliders are in said first position.

3. A tape cassette device as recited in claim 2 wherein said closing means includes biasing means resiliently biasing for holding said sliders in said first position.

4. A tape cassette device as recited in claim 3 wherein said sliders each have a plurality of projections formed on said guiding surfaces and spaced apart by a predetermined distance along the direction of tape travel.

5. A tape cassette device as recited in claim 4 wherein said sliders have tapered surfaces at the bottom ends of said guiding surfaces.

6. A tape cassette device as recited in claim 1 further comprising a loading mechanism which is disposed inside said cassette case and which prepares the tape drawn out to the center of said stationary reel for loading.

7. A tape cassette device as recited in claim 6 wherein said closing means includes engaging means for engaging with said loading mechanism for preparing the tape for loading when said closing means is in a first position.

8. A combination comprising a video tape recorder including a magnetic head and a tape driving mechanism which are projected upwardly, and a tape cassette device including;
   a cassette case;
   a stationary reel which is disposed inside said cassette case and which has a tape guide path extending from the outer circumference to the inner circumference of said stationary reel;
   an endless tape which is wound on the outer circumference of said stationary reel and the innermost part of which is drawn out along said guide path to the inside of said stationary reel to be wound on the outer circumference of said stationary reel;
   said case having a bottom plate having an opening located at the inside of said stationary reel; and
   closing means disposed inside said cassette case and displaceable between a lower position where it is located at the side bottom plate for closing said opening and an upper position where it is located away from said bottom plate for opening said opening, wherein said closing means includes at least one slider and means for displaceably guiding said sliders along the axis of said stationary reel between the first and second positions.

9. The combination as recited in claim 8, wherein said video tape recorder includes a driving means to automatically move the closing means to the upper position when the tape cassette case is loaded on the video tape recorder.

10. The device of claims 1 or 8 wherein said at least one slider comprises two sliders.

* * * * *